Patented May 26, 1936

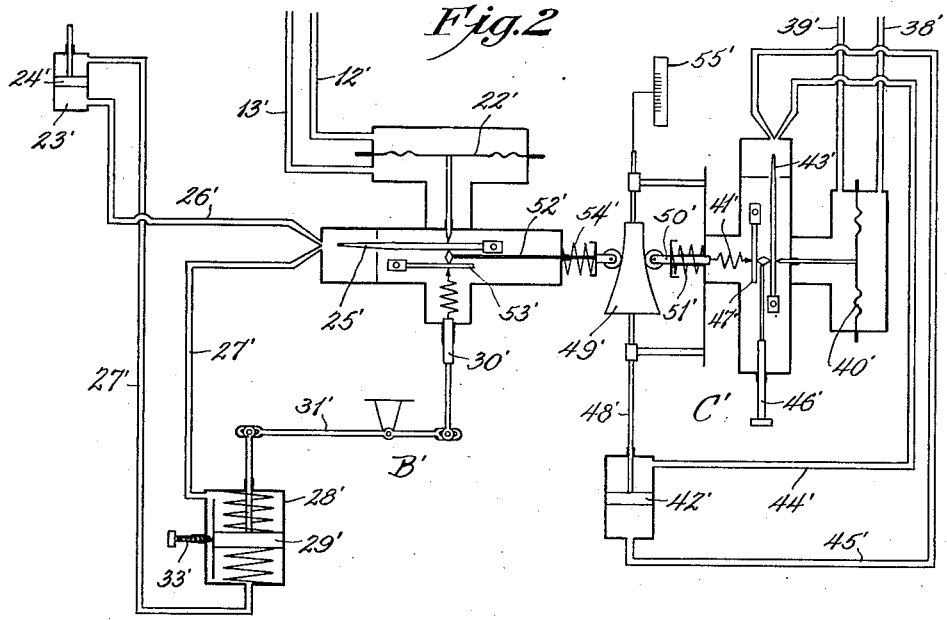
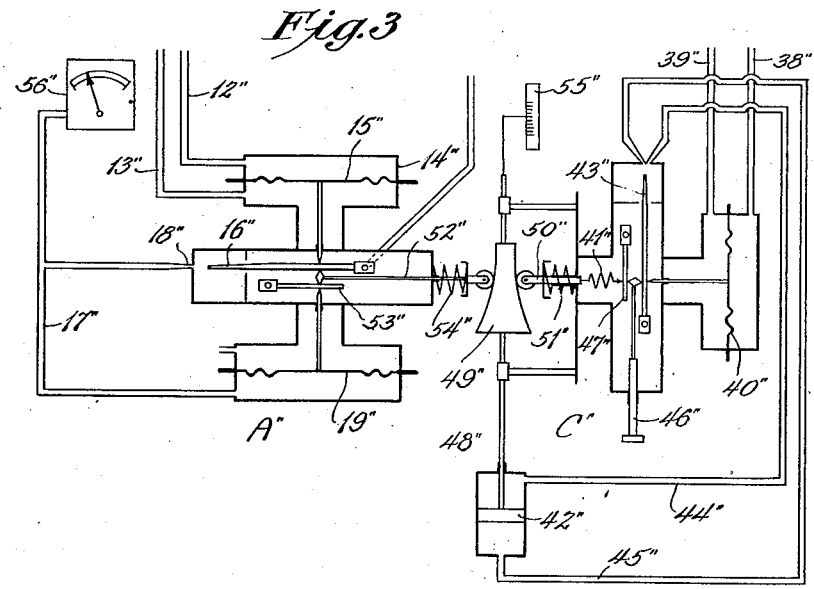

2,042,374

UNITED STATES PATENT OFFICE 2,042,374

APPARATUS FOR REGULATING AND/OR MEASURING THE FLOW OF FLUIDS

Guido Wünsch, Berlin-Steglitz, Germany, and Alan James Douglas Humby, Ipswich, England, assignors to Askania-Werke A. G. vormals Central Werkstatt Dessau und Carl Bamberg-Friedenau, a German company Application December 31, 1935, Serial No. 57,018
In Great Britain April 13, 1934

6 Claims. (Cl. 230—5)

This invention relates to apparatus for regulating and/or measuring the flow of fluids through mains or conduits and, among other objects, aims to provide a relatively simple and reliable method of regulating and/or measuring the weight of a fluid passing through a conduit wherein changes in both the volume and the density or specific gravity of the fluid are governing factors. Another aim is to provide highly sensitive, rugged and reliable regulating apparatus for delivering a constant weight of gas, such as air for supporting combustion, through a conduit, while the density of the gas varies and, incidentally, for measuring the flow in terms of standard conditions. Still another aim of the invention is to provide improved governing means of this type for controlling a variable delivery fan or pump in response to changes in the volume and density of the fluid delivered thereby.

Other aims and advantages of the invention will appear in the specification, when considered in connection with the accompanying drawings, wherein:

Fig. 2 is a similar diagrammatic view showing regulating apparatus only; and

Fig. 3 is a similar view showing flow measuring apparatus.

Figure 1:
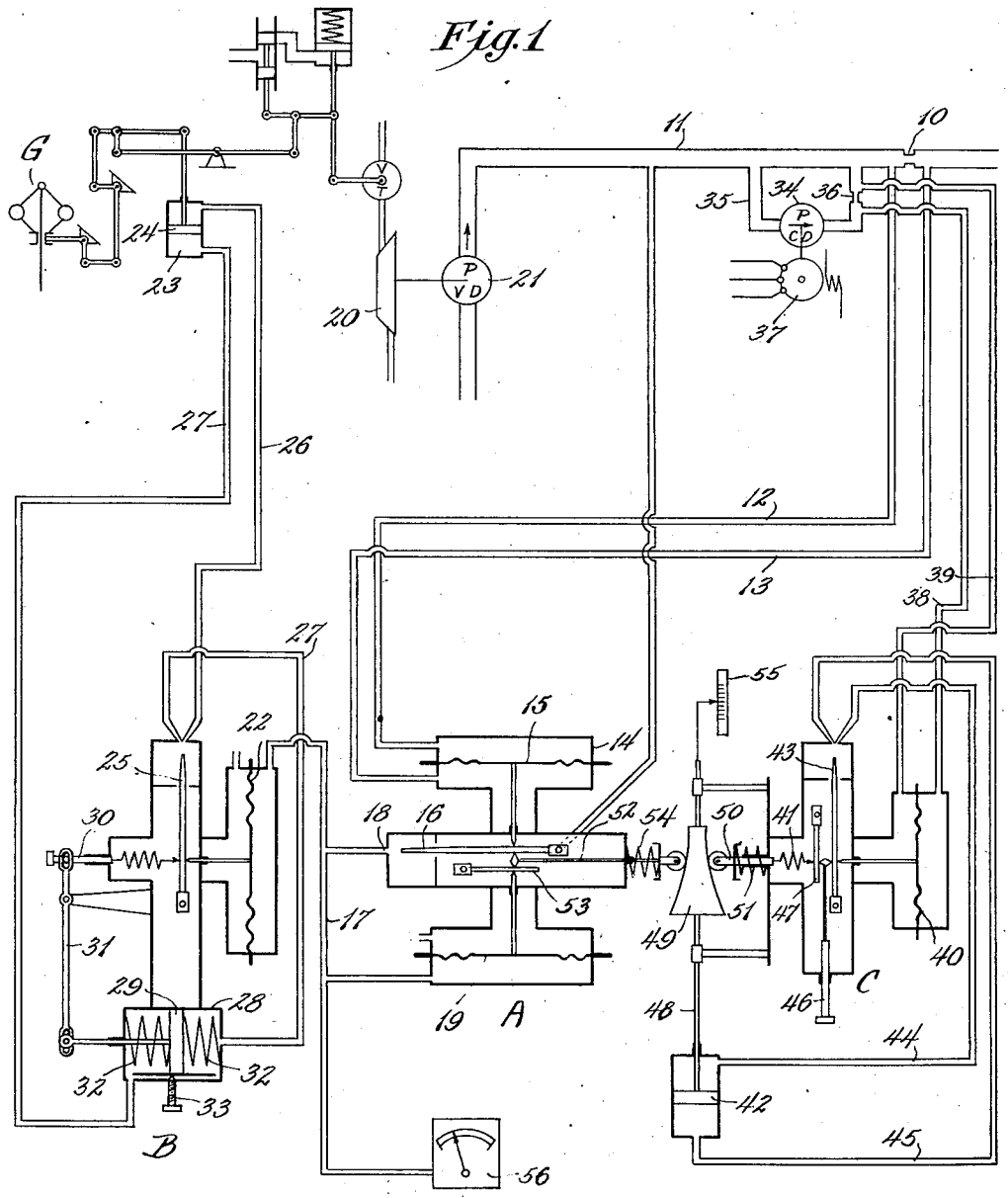
Fig. 1 is a diagrammatic illustration of apparatus for practicing the method.

Referring particularly to the drawings, the apparatus shown in Fig. 1 is especially adapted for controlling the delivery of air to a blast furnace; although it has many other industrial applications. Herein, the system includes three jet pipe regulators of the well known "Askania" type, generally designated A, B, and C, acting in conjunction with one another to maintain constant the weight of air flowing through the main conduit, taking into account variations in air density. In this instance, a restriction or fixed orifice plate 10 is provided in a blower outlet main or conduit 11 to set up a differential pressure which is proportional to the square of the quantity or volume of air flowing therethrough, assuming that the air pressure and temperature remain substantially constant. The differential pressure is conveyed by two pipes 12 and 13 to a diaphragm chamber 14 and acts on opposite sides of a diaphragm 15 of the regulator A which has a relay jet pipe 16. This jet pipe 16 is supplied with air under pressure, conveniently from the main 11, and an air pressure is thereby set up in a conduit 17 depending upon the extent to which the jet pipe registers with the orifice 18. The pressure in the supplementary conduit 17 is transmitted to a second diaphragm 19 acting upon the relay jet pipe 16 in opposition to the first diaphragm 15 to counterbalance the jet pipe. The chamber above this diaphragm is vented to the atmosphere. It therefore follows that the air pressure in the conduit 17 and on the second diaphragm 19 is directly proportional to the differential pressure set up at the orifice plate or restriction 10.

In this instance, a steam turbine 20 is shown as driving a blower 21 which is diagrammatically shown as being a variable delivery pump and the air pressure in the conduit 17 is transmitted to the diaphragm 22 of the second regulator B which, in turn, controls the turbine speed by means of a small control cylinder 23 having a piston 24 connected to the turbine governing gear G. The turbine governing gear is of conventional design and is connected to the usual throttling valve V and the control piston modifies the action of the governor. The regulator B has an oil jet pipe 25, the movement of which in one direction results in an increase and in the opposite direction in a decrease in the turbine speed.

In this example, a device of a well known type is associated with the regulator B to prevent the tendency of the governing gear to hunt due to the inertia of the turbine. If, for example, the air flow to the furnace decreases so that the oil jet pipe 25 moves to the right and increases the speed of the turbine by raising the pressure of oil in the pipe connection 26, then, due to the inertia of the turbine, the speed will not respond instantly to movements of the regulator B and will not have risen to its correct value when the regulator B has moved the governing gear G to its correct position. The regulator B will therefore tend to move the piston 24 in the control cylinder 23 and governing gear G still further and the blower 21 will ultimately be driven at an excessive speed, causing the quantity of air to increase above normal and its pressure to be increased excessively. The regulator B would then reduce the speed by increasing the oil pressure in the regulator pipe connection 27, but here again, there will be a lagging between the movement of the regulator and the subsequent speed correction. Unless provision is made to prevent this, the regulator would continue to operate or hunt in this way.

In this instance, a stabilizer is installed in the pipe line 27 and includes a cylinder 28 having a piston 29 which moves an adjustment plunger 30 for the jet pipe 25 through a pivoted lever 31.

The cylinder 28 is connected in series with the control cylinder 23 and the movement of the piston 29 therefore corresponds with all the movements of the control cylinder piston 24. If the air volume decreases so that oil passes to the control cylinder 23 through the connection 26, an equal quantity will return through the pipe 27 passing through the stabilizer, moving the piston 29 to the right and temporarily readjusting the regulator for a smaller quantity of air. The jet pipe 25 therefore returns to its neutral position and remains in this position a sufficient time for the conditions to become stabilized, that is, for the speed to change before any further correction is made. If the air quantity rises above normal, the oil passes to the control cylinder 23 through the pipe 27, shifting the piston 29 and temporarily readjusting the regulator B for a smaller quantity of air. The action of this device is, therefore, to return the jet pipe 25 to its neutral position and suspend or stop the action of the regulator when the piston 24 in the control cylinder 23 has moved through a definite portion of its stroke. This entirely eliminates the hunting which would otherwise occur. The piston 29 tends to return to its neutral position under the action of two springs 32, this being permitted by a valved bypass 33, which allows oil to leak from one side of the piston to the other. Therefore, the final adjustment of the regulator is always the same and the flow is maintained, irrespective of the positions of the control piston and the control valve. There is no need to provide a permanent variation of volume with pressure as is the case with other regulators. This particular stabilizer is covered by U. S. Patent No. 1,959,889 and may be used whenever it is desired to eliminate any objectionable hunting of the control apparatus. Reference is here made to the disclosure in said patent.

The two regulators A and B acting in conjunction with one another will maintain the weight of air constant as long as the density of air in the main or conduit 11 is constant. In practice, however, the air density will vary due to the fluctuating pressure and temperature of the air from the blower 21 and also to variations in humidity. To compensate for changes in density, the third regulator C is connected to readjust the regulator A in accordance with such variations. The air density in the main conduit 11 is measured by a small fan 34 of the positive displacement type, diagrammatically shown as being a constant delivery pump connected to a by-pass 35 having a restriction or orifice plate 36. This fan is shown as being driven by a three-phase motor 37. The arrangement is such that the fan draws air from the main 11 and returns it to the main through the restriction or orifice plate 36. The pressure differential across restriction 36 is always directly proportional to the density of the air, owing to the constant volume delivery of the fan 34. This differential pressure is transmitted by means of two pipes 38 and 39 to a diaphragm 40 in the regulator C. This diaphragm is balanced by a spring 41, the force of which is controlled by the position of a piston 42 moved by oil delivered from jet pipe 43 through conduits 44 and 45. For manual adjustment of the regulator, there is shown a ratio slider 46 cooperating with the usual pivoted counterlever 47. The purpose of this slider is to match the spring characteristic of spring 41 to the diaphragm and the differential pressure on 40. In this instance, the piston 42 has a piston rod 48 which carries a cam 49 acting on a plunger 50 which regulates the force of the spring 41. The plunger is held in contact with the cam by a compression spring 51. The cam 49 also operates a ratio slider 52 for the first regulator A arranged between the jet pipe 16 and a pivoted counterlever 53. This ratio slider is maintained in contact with the cam by means of a compression spring 54. Incidentally, the plunger and ratio slider are shown as having ordinary rollers contacting the cam 49 to eliminate friction. Now, for an increase in differential pressure on the diaphragm 40 due to an increase in density, the jet pipe 43 will move to the left, while oil passes through the pipe 45 and moves the piston 42 upwardly, causing the cam 49 to compress the spring 41 until its force just balances the pressure on the diaphragm. It therefore follows that the ratio slider 52 is moved proportionally to the pressure differential acting on diaphragm 40 and, therefore, in proportion to changes in the density of the air in the main 11. In other words, there is a definite position of cam 49 for any density and the stem carrying the cam can be made to indicate and/or record density changes by its movement. An instrument 55 is shown for this purpose. This movement of the cam is used to change the lever ratio determining the ratio between the force exerted by diaphragm 15 and by diaphragm 19. That is to say, the counterbalancing force exerted on the nozzle 16 is always a function of the density. As the cam moves upwards, the ratio slider or spacer 52 between the jet pipe 16 and the counter lever 53 is moved inwards. This means that the action of the diaphragm 15 is reduced and equilibrium will be reestablished by a lower pressure acting on diaphragm 19.

The differential pressure impulse, which, in ordinary flow controls is applied directly on diaphragm 22, is thus modified by means of regulator A and the modified impulse represented by the pressure in 17, becomes a function of the flow modified by a factor which is a function of the density. By proper design of the cam 49, it is evident to those skilled in the art that the pressure in pipe 17 can be made directly to read weight units per time unit.

Since the regulator A modifies the differential pressure obtained from orifice 10 into an air pressure which is directly proportional to it and multiplies it by a factor which is changed by means of regulator C as a definite function of the density measured by the differential pressure across 36 the pressure obtained in conduit 17 will always represent the flow through 11 multiplied by a factor which is a function of the density. More particularly, it can be made to represent fluid weight per time unit, although the invention is by no means limited to that application. An ordinary pressure indicator or recorder 56 can, therefore, be used to indicate and/or record the flow in weight units per time unit.

In the operation of the device, the regulator A is readjusted by means of the ratio slider 52 so that the pressure of air delivered to the regulator B is proportional to the weight of air delivered. Then, the regulator B controls the speed of the turbine 20 to maintain the weight of air delivered per unit of time constant. When the density of the air changes, the differential pressure across the restriction 10 is no longer a correct reading of the weight and must be corrected by a factor which is proportional to the density. The density is measured as previously explained, by the fan 34 and the orifice 36 and the differential pressure operates the third regulator C which actuates the ratio slider 52, moving it a distance proportional to the density and thus giving the correct adjustment of the regulator A at all times. If it is not desired to measure the weight of air passing through the main 11 and to obtain an indication or record of it, the first regulator A shown in Fig. 1 may be omitted and regulator B may be modified so that it is adjusted in proportion to variations in the air density in the same manner as is the regulator A. Such a modification is shown in Fig. 2, wherein the regulator C' is identical in all of its details with the regulator C in Fig. 1. The pipes 38' and 39' correspond with the pipes 38 and 39, respectively in Fig. 1 connected to the conduit on opposite sides of the orifice plate or restriction 36. The second regulator B' is governed by the differential pressure on opposite sides of the orifice plate 10 in the main conduit 11, being connected to said conduit by the pipes 12' and 13' which correspond with the pipes 12 and 13 connected to the regulator A in Fig. 1. These pipes communicate with the opposite sides of a diaphragm 22' which actuates an oil jet pipe 25' and this oil jet pipe discharges into one or the other of the pipes 26' and 27' to actuate the piston 24' which controls the governing gear. In this instance, a stabilizer is also connected in series in line 27' with the control cylinder 23' and the jet pipe 25' is counterbalanced by a plunger 30' which responds to the movement of the piston 29' of the stabilizer in a manner similar to that described in connection with Fig. 1. However, the jet pipe relay is readjusted in proportion to changes in density by the action of the regulator C' which operates a ratio slider 52' between the jet pipe 25' and a pivoted counterlever 53' in the same manner as shown in Fig. 1 in connection with the regulator A. Thus, the essential features of regulators A and B in Fig. 1, insofar as they apply to the control of the turbine governor, have been combined in the regulator B'.

It is also obvious that a simplified arrangement of the apparatus may be employed for measuring the quantity of air in terms of standard conditions passing through the main 11. Such an arrangement is shown in Fig. 3 wherein two of the regulators corresponding exactly with the regulators A and C in Fig. 1 are employed. In this case, the regulator B for controlling the operation of the governing gear G is omitted and the air conduit 17'' is connected to the indicator or recording instrument 56'', the pipe leading to the regulator B being also omitted.

It will be understood that the modifications or alternative embodiments of the mechanism shown in Figs. 2 and 3 are sub-combinations of the mechanism illustrated and explained in connection with Fig. 1, each involving omission of certain parts and their functions.

Reverting to the illustrated apparatus in Fig. 1, it will be understood that other means for constantly measuring the density of the air in the main 11 may be employed. Also, different forms of regulators may be substituted for the regulators A, B and C. Furthermore, it will be understood that the regulator B shown as being connected to control the speed of the turbine 20 which operates the air blower, may be employed to control the supply of fluid to conduit 11 in many other ways well known to those skilled in the art. The apparatus may also be used to measure the flow of air or gas entering a compressor or blower.

Obviously, the present invention is not restricted to the particular apparatus illustrated, but said apparatus is capable of various embodiments. Moreover, it is not indispensable that all parts of the separately disclosed apparatus shall be used conjointly, but they are capable of embodiment in various combinations and sub-combinations.

What is claimed is:

1. In apparatus of the character described, a gas conduit having a restriction; a primary regulator having a member connected to be operated by the differential pressure on opposite sides of said restriction; a relay member in the regulator controlled by said first named member; a constant-speed, positive displacement pump having its intake connected to said conduit and having a restriction in its outlet to create a differential pressure impulse on opposite sides of the restriction which is proportional to the density of the gas in the conduit; a second regulator relay connected to be operated by said impulse; means connecting said second regulator to effect a compensating adjustment of the said relay member in the primary regulator according to said changes in density; and means connecting said first named regulator relay to control the rate of delivery of gas through said conduit and maintain the weight flow substantially constant.

2. Apparatus for controlling the quantity of a gas passing through a conduit comprising, in combination, a regulator connected to be operated in response to a differential pressure proportional to the flow in said conduit; means for delivering a constant volume of the gas per time unit from the conduit through a restriction to create a differential pressure proportional to the density of the gas; another regulator connected to be operated in response to changes in the differential pressure on opposite sides of said restriction; a compensating device in said first named regulator connected to be operated by said second named regulator; and means connecting the first named regulator to control the quantity of gas delivered through said conduit.

3. Apparatus for controlling the quantity of gas passing through a conduit comprising, in combination, a pump connected to deliver gas to the conduit; a main pressure relay connected to be operated by a differential pressure proportional to the flow in said conduit; means for delivering a constant volume of the gas per time unit from the conduit through a restriction to create a differential pressure always proportional to the density of the gas; an auxiliary pressure relay connected to be operated by said second named differential pressure; a ratio adjusting device in said main pressure relay modifying the action of the first named differential pressure thereon and connected to be operated by said auxiliary pressure relay to create a fluid pressure proportional to the weight flow; and a controlling relay operated by the last named fluid pressure and connected to govern the speed of said pump.

4. Apparatus for controlling the quantity of gas passing through a conduit comprising, in combination, a pump connected to deliver gas to the conduit; a main pressure relay connected to be operated by a differential pressure proportional to the flow in said conduit; means for delivering a constant volume of the gas per time unit from the conduit through a restriction to create a differential pressure always proportional to the density of the gas; an auxiliary pressure relay connected to be operated by said second named differential pressure; a ratio adjusting device in said main pressure relay modifying the action of the first named differential pressure thereon and connected to be operaed by said auxiliary pressure relay to create a fluid pressure proportional to the weight flow; controlling means operated by the last named fluid pressure and connected to govern the speed of said pump; and a stabilizing device associated with said controlling means to prevent hunting of the governing means.

5. In combination with a gas delivering conduit having a restriction, a regulator connected to be operated by the differential pressure on opposite sides of said restriction and adapted to deliver a controlling impulse which is proportional to said differential pressure; means for delivering a constant volume of the gas per time unit from the conduit through a restriction to create a differential pressure proportional to the density of the gas; a relay connected to be operated by said second named differential pressure; a ratio adjusting device for said regulator modifying the action of the first named differential pressure thereon and connected to be operated by said relay whereby said controlling impulse is proportional to the weight flow of the gas per time unit delivered through said conduit.

6. In combination with a gas delivering conduit having a restriction to create a differential pressure proportional to the rate of flow, means for delivering a constant volume of gas per time unit from the conduit through a restriction to create a second differential pressure proportional to the density of the gas; a regulator connected to be operated by said first named differential pressure for creating a controlling impulse which is proportional thereto; and means responsive to the second differential pressure connected to multiply the controlling impulse by a factor which is always proportional to the density of the gas, whereby said control impulse is always proportional to the weight flow of the gas per time unit through the conduit.

GUIDO WÜNSCH.
ALAN JAMES DOUGLAS HUMBY.